Figure 1:
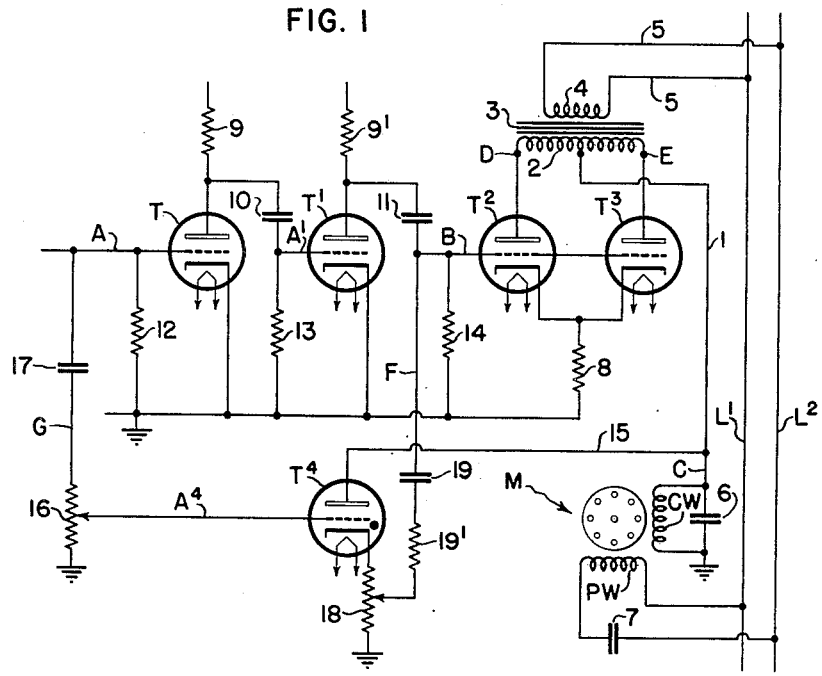

Nov. 13, 1951  J. C. MOUZON  2,574,837
ALTERNATING CURRENT MOTOR CONTROL APPARATUS
Filed Feb. 26, 1949  4 Sheets-Sheet 1

*INVENTOR.*
JAMES C. MOUZON
BY
ATTORNEY

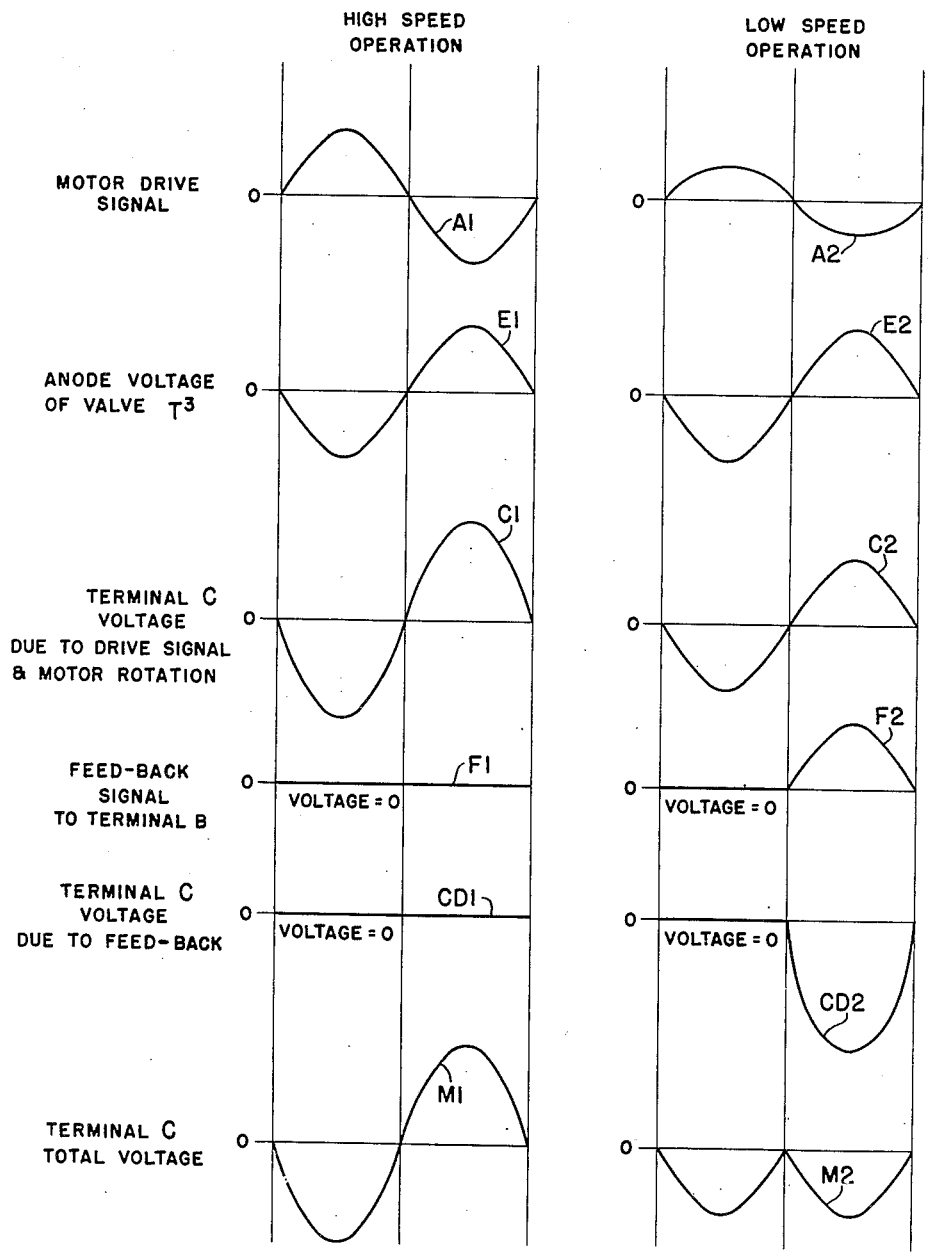

Nov. 13, 1951  J. C. MOUZON  2,574,837
ALTERNATING CURRENT MOTOR CONTROL APPARATUS
Filed Feb. 26, 1949  4 Sheets-Sheet 3

*INVENTOR.*
JAMES C. MOUZON
BY
ATTORNEY

Nov. 13, 1951          J. C. MOUZON          2,574,837

ALTERNATING CURRENT MOTOR CONTROL APPARATUS

Filed Feb. 26, 1949          4 Sheets-Sheet 4

*INVENTOR.*
JAMES C. MOUZON

BY

ATTORNEY.

Patented Nov. 13, 1951

2,574,837

UNITED STATES PATENT OFFICE 2,574,837

ALTERNATING-CURRENT MOTOR CONTROL APPARATUS

James C. Mouzon, Wyndmoor, Pa., assignor to Minneapolis-Honeywell Regulator Company, Minneapolis, Minn., a corporation of Delaware Application February 26, 1949, Serial No. 78,568

9 Claims. (Cl. 318—210)

The present invention relates to a motor control system of a well known type now in general use in self-balancing measuring apparatus in which the controlled motor is employed to rebalance a measuring circuit when the latter is unbalanced by a change in the quantity or condition measured. In that system, the motor is energized and controlled by means of an electronic voltage amplifying and motor driving system on which is impressed an alternating voltage signal varying in magnitude and phase with the extent and direction of measuring circuit unbalance.

The general object of the present invention is to provide a motor control system of the type mentioned with improved motor damping means. More specifically, the object of the present invention is to so combine means, responsive to the operating condition of the motor, with voltage amplifying and motor drive apparatus of the type mentioned so that the motor will be subjected to a damping action which is initiated in the course of a rebalancing operation when the extent of unbalance becomes small, and is terminated when balance is restored, and which does not interfere with or modify the operation of the motor when the unbalance is relatively large.

More specifically, the object of the invention is to control the damping action by means of an electronic damping control valve connected to the voltage amplifying and motor driving system, and operative to subject the motor to a damping action when balance is being approached and the motor drive current is reduced, but inoperative to produce a damping effect when the motor speed is either relatively large or is reduced to zero.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 3:
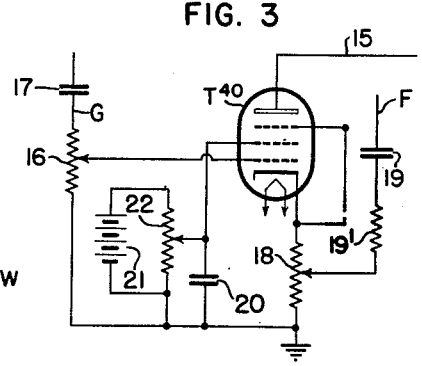

Of the drawing:

Fig. 1 is a diagram illustrating motor control apparatus including novel motor damping means;

Fig. 2 comprises curves showing voltages in different parts of the apparatus under different operating conditions;

Fig. 3 illustrates the use of a damping control valve different from that shown in Fig. 1; and Figs. 4, 5, 6, 7, 8, 9, and 10 are diagrams each illustrating a different modification of the apparatus shown in Fig. 1.

In Fig. 1, I have illustrated the use of one desirable form of the present invention in a motor control system of the type employed in a well known and widely used type of self-balancing potentiometer. As diagrammatically shown in Fig. 1, T and T' are vacuum tubes or electronic valves included in a multi-stage amplifier employed to amplify an alternating voltage signal of a magnitude and phase dependent on the extent and direction of unbalance of a measuring circuit. The signal successively amplified by the tubes T and T' is impressed on each of the control grids of two power amplifier tubes or valves $T^2$ and $T^3$. As shown and as is customary, the tubes T, T', $T^2$ and $T^3$ are triodes of commercially available types. The valves $T^2$ and $T^3$ have a common output circuit including the control winding CW of a rebalancing motor M. As shown, the winding CW has one terminal connected to ground and has its second terminal C connected by a conductor 1 to the midpoint of the secondary winding 2 of a transformer 3. The anode terminal D of the valve $T^2$ is connected to one end of the secondary winding 2, and the anode terminal E of the valve $T^3$ is connected to the second end of the secondary winding 2. The primary winding 4 of the transformer 3 has its terminals 5 connected across alternating current supply conductors L' and $L^2$ customarily supply alternating current of conventional voltage and frequency, for example, 110 volts and 60 cycles per second.

The control signal impressed on the control grid terminal A of the valve T is of the same frequency as the voltage across the supply conductors L' and $L^2$, and is approximately in phase, or 180° out of phase, with the voltage across the supply conductors, depending on the direction of measuring circuit unbalance. The control winding CW is tuned to resonance by a condenser 6 connected in parallel with the winding, and a motor power winding PW has its terminals connected across the supply conductors L' and $L^2$ in series with a suitable phase shifting condenser 7, which in conjunction with the winding PW forms a series resonant circuit. The rotor of the motor M is ordinarily of the squirrel cage type and rotates in one direction or the other accordingly as the signal impressed on the terminal A of the control grid of the valve T is in phase, or 180° out of phase, with the voltage across the supply conductors L' and $L^2$. The cathodes of the motor drive valves $T^2$ and $T^3$ are connected to ground through a common cathode resistor 8. The anodes of the valves T and T' are connected through resistors 9 and 9', respectively, each to a source of unidirectional current. The anode of the valve T is coupled by a condenser 10 to the terminal A' of the control grid of the valve T', and the anode of the valve T' is coupled by a condenser 11 to the terminal B of the connected control grids for the valves $T^2$ and $T^3$. The control grid terminals A, A' and B are connected to ground by grid resistors 12, 13 and 14, respectively, and the cathodes of the valves T and T' are connected directly to ground. In respect to the portion of the voltage amplifying and motor driving system including the valves T, T', $T^2$ and $T^3$ and the motor M with its windings CW and PW, and the circuit connections already described, the apparatus shown in Fig. 1 does not differ significantly from that included in a well known and widely used self-balancing potentiometer of the general type and form disclosed in the Wills Patent 2,423,540 of July 8, 1947.

In accordance with the present invention, a damping control valve $T^4$ is arranged to inject a damping voltage into the voltage amplifying and motor driving system when needed. A signal voltage proportional to the signal voltage to be amplified by the valves T and T' is impressed on the control grid $A^4$ of the valve $T^4$ through a connection G, and the valve $T^4$ injects a damping voltage into the amplifier and motor drive system through a controlling or feed-back connection F. As shown in Fig. 1, the control signal transmitted by the connection G to the valve $T^4$ is a portion of the voltage impressed on the terminal A of the control grid of valve T, and the damping voltage is transmitted from the valve $T^4$ through the feed-back circuit branch F to the common terminal B of the control grids of the motor drive valves $T^2$ and $T^3$. As hereinafter explained, the signal and feed-back circuit connections to the control valve $T^4$ may be connected to the voltage amplifying and motor driving circuit at points other than the points A and B of Fig. 1, providing that the signals at these other points are in suitable phase relation.

As shown, the signal circuit branch G includes a resistor 16 having one end connected to ground and having its other end connected by a coupling condenser 17 to the control grid terminal A of the valve T. The control grid terminal $A^4$ of the valve $T^4$ has its free end connected to a slider contact adjustable along the resistance 16 to regulate the signal voltage transmitted to the valve $T^4$. The cathode of the control valve $T^4$ is connected to ground by a resistor 18. The feed-back circuit branch F has one end connected to a slider contact adjustable along the resistor 18, and includes a coupling condenser 19 and a resistor 19'.

The valve $T^4$ is assumed to be a gas filled triode or thyratron which may be of the commercially available 884 type, and is characterized by having a critical firing characteristic such that for any given grid-cathode potential, a certain minimum plate-cathode potential is required to make the tube conductive. As hereinafter explained, the valve $T^4$ need not be a thyratron, but may be a pentode with sharp cut-off and arranged as shown in Fig. 3.

Preparatory to a description of the operation of the apparatus shown in Fig. 1, attention is directed to the voltage magnitude and phase relations illustrated by the curves included in Fig. 2. Those curves are arranged in two vertical columns. The curves A1, E1, C1, F1, CD1, and M1 in the left-hand column pertain to voltages existing in certain specified portions of the apparatus shown in Fig. 1 during periods in which the measuring circuit is sufficiently unbalanced to result in operation of the rebalancing motor at or near full speed. The curves A2, E2, C2, F2, CD2 and M2 in the second or right-hand column of Fig. 2 illustrate voltages existing in portions of the apparatus, corresponding to those to which the first column curves A1, E1, etc. respectively pertain, during a period in which measuring circuit balance is being approached, and in which the motor drive signal is small and the motor is coasting. Each of the curves A1, A2, E1, E2, C1, C2 and M1 is shown as of sine wave form and ordinarily approximates that form. Each of the curves illustrates a voltage existing between the respective point and ground throughout one full cycle of the alternating current supply voltage.

The curves A1 and A2 illustrate the motor signal voltage at the point A, and differ from one another only as a result of the fact that the A2 curve voltage is lower than the A1 curve voltage. In respect to its general form and the phase relation which it indicates, the curve A1 does not differ from a curve which might be drawn to illustrate the alternating current supply voltage.

The curves E1 and E2 illustrate the voltage impressed on the anode terminal E of the valve $T^3$ by the transformer secondary winding 2, and do not differ from one another in magnitude or otherwise. The curves C1 and C2 illustrate the component of the motor voltage at the terminal C which is due to the motor drive signal at the point A and to the motor rotation. As the curves indicate, the voltage represented by the curve C1 is greater than the voltage represented by the curve C2. As will be observed, the phase of the voltage represented by each of the curves E1, E2, C1, C2 and M1 is displaced 180° from the phase of the voltage illustrated by each of the curves A1 and A2. The curves F1 and F2 illustrate the feed-back signal voltage impressed on the control grid terminal B through the connection F. Since for the condition producing the curve F1 the valve $T^4$ is non-conductive, and the feed-back signal is equal to zero throughout both halves of the corresponding supply voltage cycle, the entire curve F1 is in the form of a straight line. During the first half cycle to which the curve F2 pertains, the valve $T^4$ is non-conductive and the feed-back signal is equal to zero, and the first half of the curve F2 is also a straight line. The curves CD1 and CD2 illustrate the component of the motor voltage at the terminal C which is due to the feed-back voltage signal illustrated by the curves F1 and F2. The curve CD1 is a straight line and the first half of the curve CD2 is also a straight line, in consequence of the fact that the motor voltage component due to feed-back is zero throughout the cycle to which the curve CD1 pertains, and during the first half of the cycle to which the curve CD2 pertains.

The curve M1 represents the net, or resultant, motor drive voltage at the terminal C of the winding CW. Thus the curve M1 is the resultant of the curves C1 and CD1, and hence is equal to C1 since the voltage represented by the curve CD1 is equal to zero throughout the cycle to which that curve pertains. The curve M2 represents the resultant of the curves C2 and CD2. Since the voltage component represented by the curve CD2 is equal to zero during the first half of the cycle to which that curve pertains, the first half of the curve M2 is identical to the first half of the curve C2. Since the voltage component CD2 due to the feed-back signal is greater in magnitude than, and opposite in polarity to, the voltage component illustrated by the curve C2 during the second half of the cycle to which the curves C2 and CD2 pertain, the resultant motor voltage at the terminal C during the second half of the cycle to which the curve M2 pertains is negative relative to ground as is the motor voltage represented by the curve C2 during the first half of said cycle in which the voltage represented by the curve CD2 is zero.

During each period in which the rebalancing motor is operating at substantially full speed, the control valve $T^4$ is non-conductive and no potential drop across the resistance 18 is then produced, and no feed-back voltage signal is then fed to the terminal B through the connection F. The non-conductivity of the valve $T^4$ during full speed operation periods may be explained as follows: During the first half of each supply voltage cycle, the tube $T^3$ is non-conductive and the current then flowing through the tube $T^2$ results in a voltage drop in the winding CW which makes the potential of the terminal C negative relative to the ground potential, and thus prevents the control valve $T^4$ from then becoming conductive. During the second half of each supply voltage cycle, the potential of the point B is made sufficiently negative with respect to the ground potential by the full speed motor drive signal to prevent each of the tubes $T^2$ and $T^3$ from then becoming conductive. Although the condenser 6 is then operative to discharge through the winding CW and thereby make the potential of the terminal C positive with respect to the ground potential, the tube $T^4$ is not thereby made conductive because the control signal then being transmitted to the control grid of the valve $T^4$ from the point A is too strongly negative with respect to ground to permit the tube $T^4$ to fire.

When the motor drive signal at the point A drops below a certain minimum value, however, the signal fed through the connection G to the control grid of the valve $T^4$ will not swing that grid sufficiently negative with respect to ground to prevent the valve $T^4$ from firing during the second half of each supply voltage cycle in which the terminal C swings positive with respect to ground. The extent to which the motor drive signal at the point A must be reduced, below its value required for operation of the motor M at full speed, may be varied as conditions make desirable by the adjustment along the resistor 16 of the slider contact connected to the grid terminal $A^4$ of the valve $T^4$.

Even though the motor drive signal at the point B may have been substantially reduced by the decrease in measuring circuit unbalance, the voltage between the terminal C and ground will remain fairly high while the motor is coasting, since the voltage across the control winding CW is proportional to the speed of motor rotation when the motor is merely coasting.

As soon as the tube $T^4$ becomes conductive, the current flows through the cathode resistor 18 of the valve and produces a potential drop therein. That voltage drop makes the slider contact engaging the resistor 18 positive with respect to ground. In consequence, the positive feed-back voltage, shown by the curve F2, is then impressed on the grid terminal B. That voltage does not affect the valve $T^2$ since the anode terminal D of the valve $T^2$ is then negative. However, the positive feed-back voltage signal impressed on the point B makes the valve $T^3$ conductive. When the valve $T^3$ is thus made conductive, it causes a current pulse to flow through the motor control winding CW in the direction to make the terminal C negative relative to ground, as is indicated by the curve CD2.

In practice, the adjustment position of the slider contact, through which the feed-back connection F engages the resistor 18, should be such that the feed-back voltage signal impressed on the point B will cause a voltage pulse to be impressed on the winding CW which exceeds the normal voltage across the winding CW sufficiently to produce the resultant voltage shown by the second half cycle portion of the curve M2. As will be readily apparent, the motor control winding voltage component, illustrated by the curve C2 and resulting from the then small motor drive signal, combines with the damping voltage CD2 to produce the net motor control winding voltage M2. The latter tends to drive the motor in the direction opposite to that in which the motor is then coasting, and the motor M is thus subjected to a damping or braking action as a result of the feed-back signal voltage impressed on the point B when the valve $T^4$ is made conductive.

In consequence of the damping action and the then small value of the motor drive signal, the motor speed is quickly reduced to zero, and the voltage developed across the winding CW is decreased so that the feed-back voltage transmitted to the point B through the connection F is correspondingly decreased. Finally just before the motor comes to rest, the voltage developed by transformer action across the winding CW drops to a value which is insufficient to maintain the conductivity of the valve $T^4$, whereupon the feed-back voltage signal transmitted to the point B is substantially reduced to zero. Thus as the motor comes to a stop, the damping action disappears, with the desirable result of preventing the development of an unnecessarily large dead spot. While the motor M is at rest, the voltage developed across the winding CW is insufficient to cause the valve $T^4$ to be conductive even though the transformer action within the motor may cause that voltage to be as high as 30 volts.

The foregoing description of the operation of the apparatus shown in Fig. 1 has been confined to the operating condition in which the direction of measuring circuit unbalance requires the rebalancing rotation of the motor M to be in the clockwise direction. When the direction of unbalance is reversed so that the required rebalancing rotation of the motor is in the counter-clockwise direction, the operation of the apparatus is substantially unchanged except that the motor winding CW is then energized by motor drive valve $T^3$, while the valve $T^2$ is rendered conductive by the damping signal produced when the valve $T^4$ is made conductive. The motor drive signal at the point A which produces the counter-clockwise rotation of the motor M is 180° out of phase with the motor drive signal which results in the clockwise motor rotation. The counter-clockwise motor drive signal is thus in phase with the voltage between the anode terminal E and ground, and is 180° out of phase with the anode voltage between the valve $T^2$ and ground.

Thus when the motor is being driven counter-clockwise at substantially full speed, the valve $T^3$ is conductive during the second half only of each cycle of the supply voltage, and the signal applied to the control grid of the control valve $T^4$ from the point A then prevents the control valve $T^4$ from being conductive during the first half of each cycle. As balance is approached and the motor drive signal at the point A is sufficiently reduced, the control valve $T^4$ becomes conductive during the first half of each cycle, and a positive damping voltage is fed back to the point B during the first half of each cycle of the supply voltage, i. e. during the half cycle in which the valve $T^2$ can be made conductive. In consequence, the rebalancing motor is then subjected to a damping action which quickly brings the motor to rest.

As previously indicated, various changes may be made in the form of the invention illustrated in Fig. 1, and each of Figs. 3–8 illustrates a different modification of the apparatus shown in Fig. 1. In the modification shown in Fig. 3, the thyratron or gas filled valve $T^4$ of Fig. 1 is replaced by a sharp cut-off, high vacuum, pentode valve $T^{40}$. As shown, the suppressor grid of the valve $T^{40}$ is connected directly to the cathode of the valve, and the screen grid of the valve is connected to ground by a by-pass condenser 20. In Fig. 3, the screen grid of the valve is also connected to a variable source of direct voltage. As diagrammatically shown, the variable voltage source is a battery 21 having its negative terminal connected to ground, and having its positive and negative terminals connected by a slide wire resistor 22. The latter is engaged by an adjustable slider contact connected to the screen grid of the valve. By adjustment of said slider contact along the resistor 22, the operation of the valve $T^{40}$ may be so adjusted that the anode voltage supplied through the conductor 15 from the motor control winding CW will be insufficient to make the pentode conductive when the rebalancing motor is not rotating.

Figure 4:
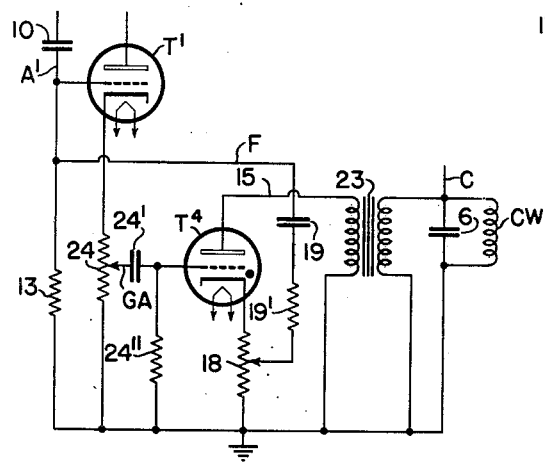

In the modification shown in Fig. 4, the output circuit of the control valve $T^4$ is coupled by a transformer 23 to the motor control winding CW in such manner that the voltage between the anode of the valve $T^4$ and ground is 180° out of phase with the voltage between the upper terminal C of the motor control winding CW and ground. This shift in the phase of the anode voltage is attended by appropriate changes in the connections in the control signal and feedback signal connections associated with the valve $T^4$, which enable the modified apparatus to operate in the same general manner as the Fig. 1 apparatus. In Fig. 4, the feed-back connection F connects the cathode resistor 18 of the valve $T^4$ to the control grid terminal A' of the amplifier valve T'. As will be recognized, the voltage of the terminal A' of the valve T' is displaced 180° from the voltages of the terminals A and B of the valves T and $T^2$ respectively. In Fig. 4, the control signal connection GA to the valve $T^4$ comprises a conductor and a coupling condenser 24' which connect the control grid of the valve $T^4$ to a slider contact engaging a slide wire resistor 24 which serves as a cathode resistor for the valve T'. A grid resistor 24" connects the control grid of the valve $T^4$ to ground. As will be apparent, the modification illustrated in Fig. 4 of the apparatus shown in Fig. 1 will not change the general operation of that apparatus, provided the control signal connection GA and the feed-back connection F of Fig. 4 are properly adjusted to compensate for the fact that the potential differences between ground and the terminal A' and the cathode of the valve T' are somewhat different from the potential differences between ground and the terminals A and B of Fig. 1.

Figure 5:
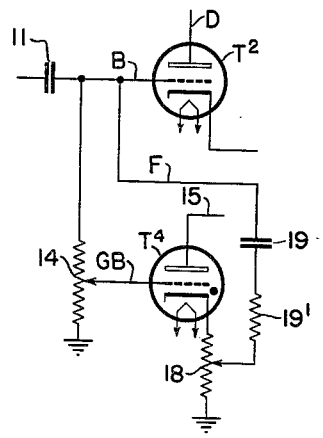

Fig. 5 illustrates a modification in which the control grid of the valve $T^4$ is connected by a connection GB to the control grid terminal B of the valve $T^2$. As shown, the connection GB comprises a conductor connected at one end to the control grid of the valve $T^4$, and connected at its opposite end to a slider contact adjustable along the grid resistor 14 connected to the grid terminal B. This arrangement is desirable in some cases in which the magnitude of the voltage of the grid terminal B of the valve $T^2$ is more suitable for controlling the valve $T^4$ than is that of the voltage of the control grid A of the valve T.

In the modification shown in Fig. 5, the signal and feed-back connections GB and F of the valve $T^4$ are both connected to the terminal B of the control grid of the valve $T^2$. There is no disadvantage in such connections, since when the terminal B is positive, the control winding terminal C connected to the anode of the valve $T^4$ is always negative relative to ground and prevents the valve $T^4$ from becoming conductive. When the point B swings negative with respect to ground as a result of a substantial motor drive signal, the adjustable resistors 18 and 14, if suitably adjusted, will cause the grid of the valve $T^4$ to swing negative to a greater extent than does the cathode of the valve $T^4$ so that the valve will remain non-conductive. However, when the motor drive signal B has dropped to a predeterminable minimum value, the point B will not swing sufficiently negative to prevent the valve $T^4$ from firing when the value of the voltage transmitted to the anode of the valve $T^4$ through the conductor 15 from the motor control winding corresponds to a speed of motor rotation higher than is desirable. Although the point B may be somewhat negative with respect to ground at the instant that the tube $T^4$ fires, the feedback connection to the point B from the resistor 18 will then cause the grid terminal B to swing sharply positive, and cause the control grid of the valve $T^4$ to swing positive also. The positive swing of the control grid thus produced is inconsequential, since the valve $T^4$ is already conductive. The valve $T^4$ returns to its non-conductive condition during the succeeding half cycle in which the anode of the valve $T^4$ swings negative with respect to ground.

In the arrangements of Figs. 1, 3, 4, and 5, it is desirable to include the resistor 19' in the feed-back connection F in order to insure that the net grid-cathode signal applied to the damping valve $T^4$ will always be of sufficient magnitude and of the correct phase to properly control the conductivity of that valve. In the following arrangements of Figs. 6 through 10, however, the resistor 19' is usually not needed, inasmuch as these arrangements include other means for permitting the attainment of the correct magnitude and phase of the control signal for the valve $T^4$.

Figure 6:
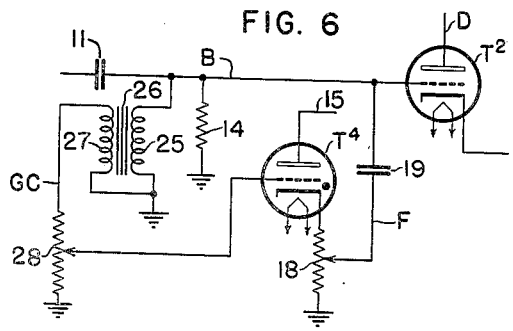

In Fig. 6, I have illustrated an arrangement which may be found useful under conditions making it desirable to impress a signal voltage on the control grid of the valve $T^4$ which is higher than any signal voltage directly obtainable from the grid terminal B of the valve $T^2$. In Fig. 6, the terminal B is connected to ground through the primary winding 25 of a step-up transformer 26. The latter has a secondary winding 27 with one terminal grounded directly and with its second terminal connected to ground through a conductor GC and a slide wire resistor 28. The control grid of the valve $T^4$ is connected to the resistor 28 through a slider contact adjustable along the resistor 28. By suitably varying the ratio of the primary and secondary windings of the transformer 26, any desirable voltage can be developed across the resistor 28 when a given motor drive signal is impressed on the control grid B of the valve $T^2$. The primary and secondary windings of the transformer 26 are so arranged that the voltage transmitted from the resistor 28 to the control grid of the valve $T^4$ of Fig. 6 may be of the same phase as the voltage of the motor drive signal impressed on the control grid of the valve $T^2$. When desirable, the coupling transformer 26 of Fig. 6 may be utilized in such forms of the invention as are shown in Fig. 1 and in Fig. 4. With the Fig. 4 arrangement, however, it is necessary to reverse the leads to one of the windings of the transformer 26 to obtain the necessary 180° phase shift needed to compensate for the signal phase shift produced if the primary winding of the transformer 26 is connected to the grid electrode of one of the valves T and $T^2$ instead of to the grid or cathode electrode of the valve $T'$.

Figure 7:
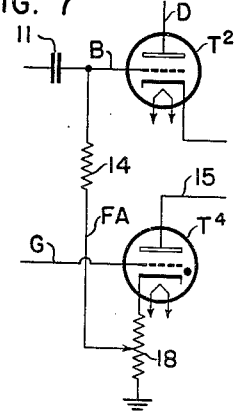

Fig. 7 illustrates a modification of the feed-back arrangement shown in Fig. 1. In Fig. 7, the slider contact engaging the resistor 18 is connected to the control grid terminal B of the valve $T^2$ by a conductor FA in series with the grid resistor 14. The condenser 19 included in the feed-back conductor F, shown in the forms of the invention previously described, is omitted in Fig. 7. The arrangement shown in Fig. 7 has an advantage over each of the arrangements previously described, in that no portion of the Fig. 7 resistor 18 is effectively connected in parallel with the grid resistor connected to the control grid to which the damping signal is directly fed by the feed-back connection FA. As will be apparent, however, a portion of the cathode resistor 18 is effectively connected in parallel with the grid resistor 14 in Figs. 1, 5 and 6, and in parallel with the grid resistor 13 in Fig. 4.

In Fig. 7, the portion of the resistor 18 below the slider contact connecting the resistor to the feed-back connection FA is connected in series, not in parallel, with the grid resistor 14. The arrangement shown in Fig. 7 permits the resistance of the resistor 18 to be as small as is desirable, while the resistor 18 must have a relatively high resistance, when it has a portion effectively connected in parallel with the associated grid resistor 14 or 13, to avoid short circuiting said grid resistor.

A high resistance value for the resistor 18 is definitely undesirable in cases in which the resultant large voltage drop in the plate circuit of the valve $T^4$ is undesirable.

Figure 8:
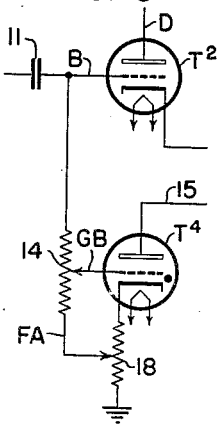

In Fig. 8, I have illustrated a modification embodying the characteristic features of Figs. 5 and 7, in that the feed-back connection FA of Fig. 7 is combined with a conductor GB which connects the control grid of the valve $T^4$ to the grid resistor 14 of the valve $T^2$, as it does in Fig. 5.

Figure 9:
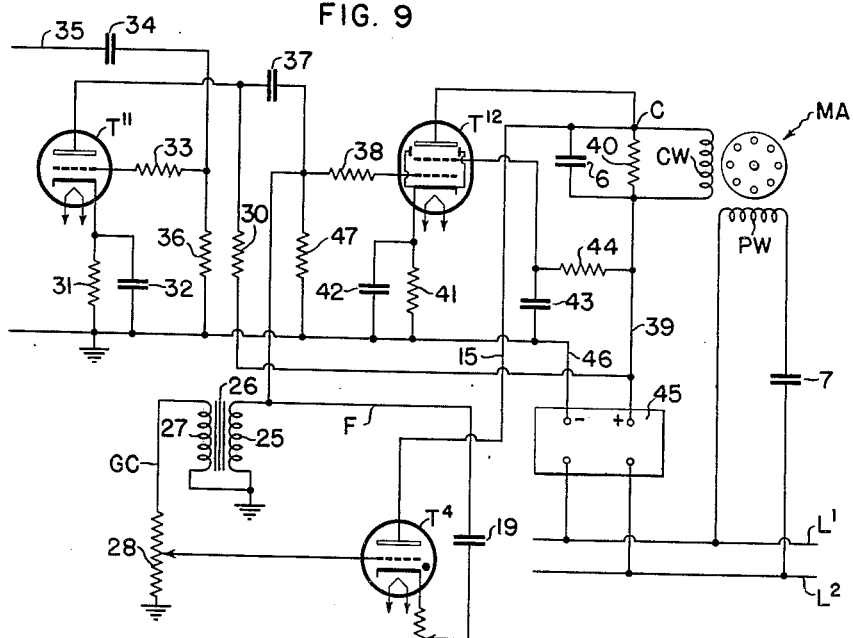

In each of Figs. 1–8, the voltage amplifying and motor drive system is assumed to be of the type and form illustrated in the above mentioned Patent 2,423,540. Fig. 9 illustrates an embodiment of the invention in apparatus in which the voltage amplifying and motor drive system is of a known form differing from that disclosed in said prior patent. In Fig. 9 the triode valve $T^{11}$ constitutes the third stage valve of a system amplifying an alternating signal formed by converting a small direct current into an alternating current in a converter of known form which may or may not be that shown in said prior patent. The valve $T^{11}$ may well be one of the pair of valves in a twin valve tube of the commercially available 6SL7 type. The anode of the valve $T^{11}$ is supplied with direct current through a resistor 30, and the cathode of the valve $T^{11}$ is connected to ground through a cathode resistor 31 and a condenser 32 in shunt therewith. The control grid of the valve $T^{11}$ is connected through a resistor 33 and a coupling condenser 34 to a conductor 35 connected to the anode of the second stage valve, not shown, of the voltage amplifier. The junction of the resistor 33 and condenser 34 is connected to ground through a grid resistor 36.

A power amplifier motor driving valve $T^{12}$ has its control grid connected to the anode of the valve $T^{11}$ through a coupling condenser 37 and a resistor 38. The control grid of the valve $T^{12}$ is also connected to ground through a resistor 47. As shown, the valve $T^{12}$ is a beam power tetrode, which may be of the commercially available 6L6 type, and is supplied with anode voltage through a resistor 40 from a direct current supply conductor 39 at a potential positive relative to ground. The cathode of the valve $T^{12}$ is connected to ground through a resistor 41 and a condenser 42 in parallel therewith. The screen grid of the valve $T^{12}$ is connected to ground through a condenser 43 and is connected to the supply conductor 39 by a resistor 44. As shown, the resistor 40 is connected to the supply conductor 39 in parallel with the control winding CW and condenser 6 of a rebalancing motor MA. The latter may be a two phase reversible motor like the motor M of Fig. 1. The power winding PW of the motor MA is arranged for connection through condenser 7 to conductors $L'$ and $L^2$ supplying alternating current of the same frequency as the signal voltage amplified. As diagrammatically shown in Fig. 9, the conductor 39 is the positive output terminal of a full wave rectifier 45 which has its negative output terminal 46 connected to ground. Alternating current to be rectified is supplied to the rectifier 45 by supply conductors L and $L^2$ to which the terminals of the rectifier 45 may be directly connected.

The modification shown in Fig. 9 includes a valve $T^4$ having a feed-back connection F and a control signal connection including a conductor GC and transformer 26. These connections lead to the control grid terminal of the valve $T^{12}$, substantially in the same manner as the feed-back and control grid connections of the valve $T^4$ of Fig. 6 are connected to the grid terminal B of the valve $T^2$. The overall operation of the apparatus shown in Fig. 9 is substantially the same as that of the apparatus shown in Fig. 1 when modified as illustrated in Fig. 6.

Figure 10:
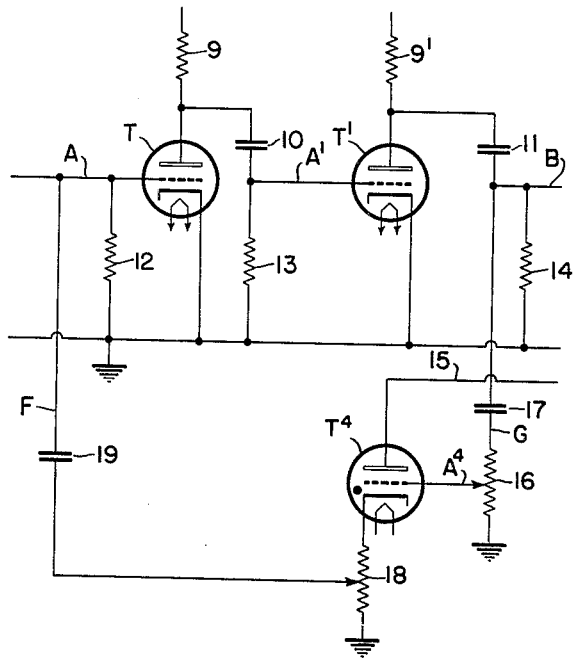

In Fig. 10, I have illustrated a modification of the apparatus of Fig. 1 wherein the control and feed-back connections G and F, respectively, of Fig. 1 are interchanged at the terminals A and B of the amplifier. Specifically, in the apparatus of Fig. 10, the control connection G connects the control grid terminal $A^4$ of the damping valve $T^4$ to the control grid terminal B of the valve $T^2$, while the feed-back connection F connects the cathode resistor 18 of the valve $T^4$ to the control grid terminal A of the valve T. With this arrangement, the signal voltage available for application to the control grid of the valve $T^4$ will always be greater than that applied to the cathode of this valve, since the signal potential at the terminal B will be higher than that at the terminal A, due to the amplification effected by the valves T and T'. Further, the application of the feed-back signal to the point A in the Fig. 10 arrangement will cause a desirably high feed-back voltage to appear at the terminal C, again due to the amplification produced by the valves T and T'. Aside from these differences, the operation of the apparatus of Fig. 10 is identical to that of the Fig. 1 apparatus.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent is:

1. In motor control apparatus of known type in which an alternating current signal is amplified in a multi-stage electronic amplifier having an output circuit including the anode and cathode elements of electronic valve means and including in series therewith a resonant circuit consisting of a parallel connected condenser and the control winding of a reversible alternating current motor which has also a power winding arranged for connection to a source of alternating current of the same frequency as said signal, the improvement which comprises an electronic damping valve having a control grid and having anode and cathode elements respectively connected to the end terminals of said resonant circuit to which are respectively connected the anode and cathode elements of said valve means, a cathode resistor connected in the cathode circuit of said damping valve, and a control connection and a feed-back connection respectively connecting said control grid and said cathode resistor to points in said amplifier at which the voltages of the signal amplified by the apparatus are of substantially the same phase.

2. Apparatus as specified in claim 1, in which said electronic valve means comprises two triodes each having an anode connected to a respective one of the end terminals of a power transformer secondary winding having also a center-tap connection, and in which the anode of said damping valve and one terminal of said control winding are connected to said center-tap connection of said secondary winding.

3. Apparatus as specified in claim 1, in which said valve means consists of a single tetrode.

4. Apparatus as specified in claim 1, in which said damping valve is a thyratron.

5. Apparatus as specified in claim 1, in which said damping valve is a sharp cut-off pentode.

6. Apparatus as specified in claim 1, in which said control and feed-back connections connect the control grid of said damping valve and said cathode resistor respectively to points in separate stages of said amplifier at which the signals amplified by the apparatus are of substantially the same phase.

7. Apparatus as specified in claim 1, in which said control and feed-back connections connect both the control grid of said damping valve and said cathode resistor to the input circuit of a single one of the stages of said multi-stage amplifier.

8. Apparatus as specified in claim 1, in which said control connection connects the control grid of said damping valve to a point in one of the stages of said multi-stage amplifier, and in which said feed-back connection connects said cathode resistor to a point in a stage of said amplifier which is ahead of said one stage.

9. In motor control apparatus of known type in which an alternating current signal is amplified in a multi-stage voltage amplifier having its output circuit connected to the input circuit of a motor drive system comprising a pair of power tubes having their anodes connected one to one end and the other to the second end of the secondary winding of a power transformer having its primary winding arranged for connection to a source of alternating current having the same frequency as said signal, and having the cathodes of said power tubes connected to the midpoint of said secondary winding through a resonant circuit including the control winding of an alternating current motor which has also a power winding arranged for connection to said source of alternating current, the improvement which comprises a thyratron having a control grid, an anode connected to the anodes of said power tubes through said secondary winding, and a cathode connected through a cathode resistor to said power tube cathodes, and a control connection and a feed-back connection respectively connecting said control grid of said thyratron and said cathode resistor to points in said amplifier at which the voltages of the signal amplified by the apparatus are of substantially the same phase.

JAMES C. MOUZON.

REFERENCES CITED

The following references are of record in the file of this patent:

UNITED STATES PATENTS

| Number | Name | Date |
|---|---|---|
| 2,367,746 | Williams | Jan. 23, 1945 |
| 2,457,792 | Wild et al. | Jan. 28, 1948 |